United States Patent

Yamada et al.

[11] Patent Number: 5,942,831
[45] Date of Patent: Aug. 24, 1999

[54] LAMINATED CORE

[75] Inventors: Toyonobu Yamada, Hisai; Shoji Fujimori, Yokkaichi, both of Japan

[73] Assignee: Kabushiki Kaisha Toshiba, Kanagawa-ken, Japan

[21] Appl. No.: 08/754,147

[22] Filed: Nov. 22, 1996

[30] Foreign Application Priority Data

Dec. 1, 1995 [JP] Japan .................................. 7-314114

[51] Int. Cl.⁶ .......................... H02K 15/00; H02K 15/02
[52] U.S. Cl. ............................. 310/217; 310/216; 310/42; 310/259; 29/596
[58] Field of Search ................................... 310/216, 217, 310/254, 42, 259; 29/596

[56] References Cited

FOREIGN PATENT DOCUMENTS 56-66023  11/1979  Japan .
4-56304   6/1990   Japan .
7-241629  3/1994   Japan .

Primary Examiner—Thomas M. Dougherty
Assistant Examiner—Burton Mullins
Attorney, Agent, or Firm—Limbach & Limbach, LLP

[57] ABSTRACT

A laminated core for dynamoelectric machines and so on is formed of thin sheet core pieces each blanked into a predetermined configuration and stacked one upon another and are successively welded at a plurality of weld zones of an edge of each core piece by continuous or spot irradiation of laser beams so that the core pieces are combined together. The core piece constituting one of two end faces of the core has first notches formed in one half of the weld zones of the core piece. The core piece constituting the other end face of the core has second notches formed in one half of the weld zones of the core piece constituting the other end face of the core. The first notches are shifted from the second notches by 90 degrees.

4 Claims, 9 Drawing Sheets

LAMINATED CORE

BACKGROUND OF THE INVENTION

1. Field of the Invention

This invention relates to laminated cores for dynamoelectric machines or magnetic pickup or recording heads which are formed by stacking thin sheet metal core pieces each having a predetermined configuration and by welding the stacked core pieces together by means of laser beams, and a method of making the same.

2. Description of the Prior Art

In cores used for dynamoelectric machines such as electric motors or magnetic pickup or recording heads used in tape recorders, thin sheet core pieces each having a predetermined configuration are conventionally blanked out of a material and are then stacked one upon another. The stacked core pieces are combined together by welding boundaries therebetween by means of continuous or spot irradiation of laser beams.

In a prior art method, the above-described stacking of core pieces and the laser beam welding of the boundaries are executed in one continuous step. More specifically, a first core piece is blanked out of a material, and a second core piece is blanked out of the material and is stacked on the first core piece. A third core piece is then blanked out of the material and is stacked on the second core piece. The above-described sequence is repeated. Simultaneously with the above-described step, laser beams are emitted from a plurality of laser beam emitting sections disposed around the boundaries of core pieces so that the laser beams are irradiated onto a plurality of portions of circumferential edges of the stacked core pieces, thereby sequentially welding the core pieces together.

In the above-described method, the stacked core pieces include those for a plurality of core units 101 but not for a single core unit 101 as shown in FIG. 20. When irradiation of laser beams is indifferently continued under the circumstances, the stacked core pieces composing a plurality of core units 101 are welded together to be integrated. To obviate this drawback, the prior art has provided a welding manner in which laser beam irradiation is interrupted for boundary core pieces between those composing the core units 101 so that the individual core units 101 can be separated.

Unwelded portions of the core piece resulting from interruption of laser beam irradiation need to be located so as to conform to the stack thickness of the core unit 101 so that the individual core units can reliably be separated. However, the stacked core pieces are displaced in the direction of stack when the thickness of the core piece is varied. Consequently, the unwelded portions of the core piece do not conform to the timing for interruption of laser beam irradiation, that is, the unwelded portions are displaced. In such a case, the unwelded portions of the core piece are unavoidably welded such that the core units is rendered inseparable.

To solve the above-described problem, the prior art has provided installation of a thickness measuring device for measuring the thickness of each core piece for determination of a laser beam irradiation position. However, this has resulted in an increase in the cost of equipment.

SUMMARY OF THE INVENTION

Therefore, an object of the present invention is to provide a laminated core wherein the individual core units can reliably be separated without interruption in the laser beam irradiation and an increase in the cost of equipment, and a method of making the same.

In one aspect, the present invention provides a laminated core wherein thin sheet core pieces each blanked into a predetermined configuration are stacked one upon another and are successively welded at a plurality of weld zones provided on an edge of each core piece by continuous or spot irradiation of laser beams so that the core pieces are combined together so as to have two end faces. The core comprises first notches formed in one half of the weld zones of the core piece constituting one of the end faces of the core, and second notches formed in one half of the weld zones of the core piece constituting the other end face of the core, said one half of the weld zones of the core piece constituting said other end face of the core corresponding to the other half of the weld zones of the core piece constituting said one end face of the core.

In another aspect, the invention provides a method of making a laminated core wherein thin sheet core pieces each blanked into a predetermined configuration are stacked one upon another and are successively welded at a plurality of weld zones provided on an edge of each core piece by continuous or spot irradiation of laser beams so that the core pieces are combined together so as to have two end faces. The method comprises the steps of forming first notches in one half of the weld zones of the core piece constituting one of the end faces of the core, and forming second notches in one half of the weld zones of the core piece constituting the other end face of the core, said one half of the weld zones of the core piece constituting said other end face of the core corresponding to the other half of the weld zones of the core piece constituting said one end face of the core.

According to the above-described laminated core and the method of making the same, the first notches are formed in one half of the weld zones of the core piece constituting one of the end faces of each core unit. The second notches are formed in one half of the weld zones of the core piece constituting the other end face of each core unit. Said one half of the weld zones formed with the second notches correspond to the other half of the weld zones of the core piece formed with the first notches. Thus, the core pieces constituting one of two end faces of each core unit and the other of the end faces of the adjacent core unit lack portions for the welding. Accordingly, the boundary between these core pieces constituting one end face of each core unit and the other end face of the adjacent core unit is not welded due to the notches formed in these core pieces even when the laser beams are irradiated onto all the boundaries of the stacked core pieces. Consequently, the laser beam irradiation need not be interrupted. Furthermore, since the individual core units can reliably separated, no thickness measuring device for measuring the thickness of the core piece is necessary, whereupon an increase in the cost of equipment can be prevented.

First concavities may be formed in portions of a surface of the core piece constituting one of the end faces of the core, instead of the above-described first notches, said portions of the surface corresponding to the respective weld zones. Second concavities may be formed in portions of an underside of the core piece constituting the other end face of the core, instead of the second notches, said portions of the underside corresponding to the respective weld zones. Each of the first and second concavities has a depth equal to or above one half of a thickness of the core piece. In this constitution, too, the boundary between the core pieces constituting one end face of each core unit and the other end face of the adjacent core unit is not welded due to the concavities formed in these core pieces even when the laser beams are irradiated onto all the boundaries of the stacked core pieces. Consequently, the same effects as those described above can be achieved in this constitution.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

A first embodiment in accordance with the present invention will be described with reference to FIGS. 1 to 12 of the accompanying drawings. In the embodiment, the invention is applied to a laminated core for a dynamoelectric machine and a method of making the same.

Figure 1:
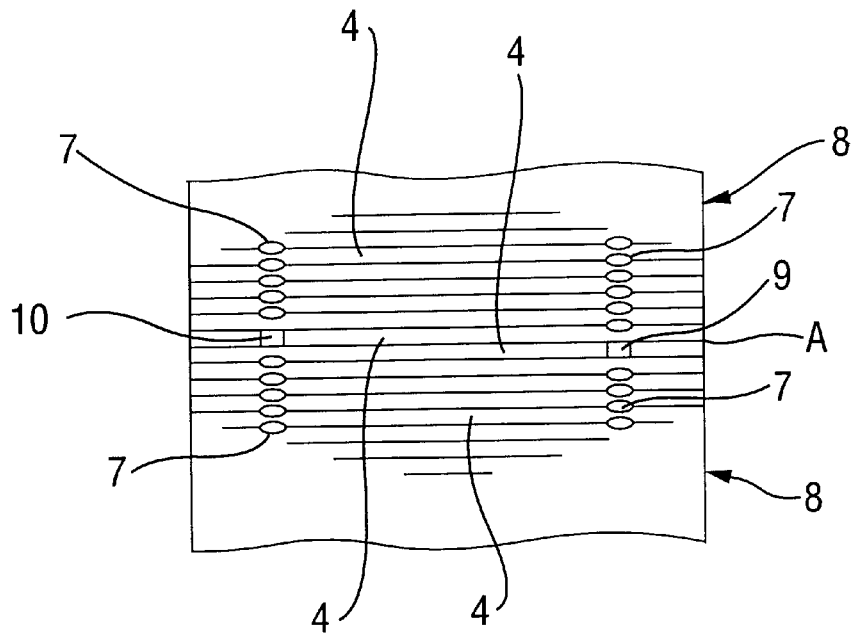
FIG. 1 is a partial front view of core pieces stacked and welded together, the core pieces constituting a laminated core of a first embodiment in accordance with the present invention.
Figure 2:
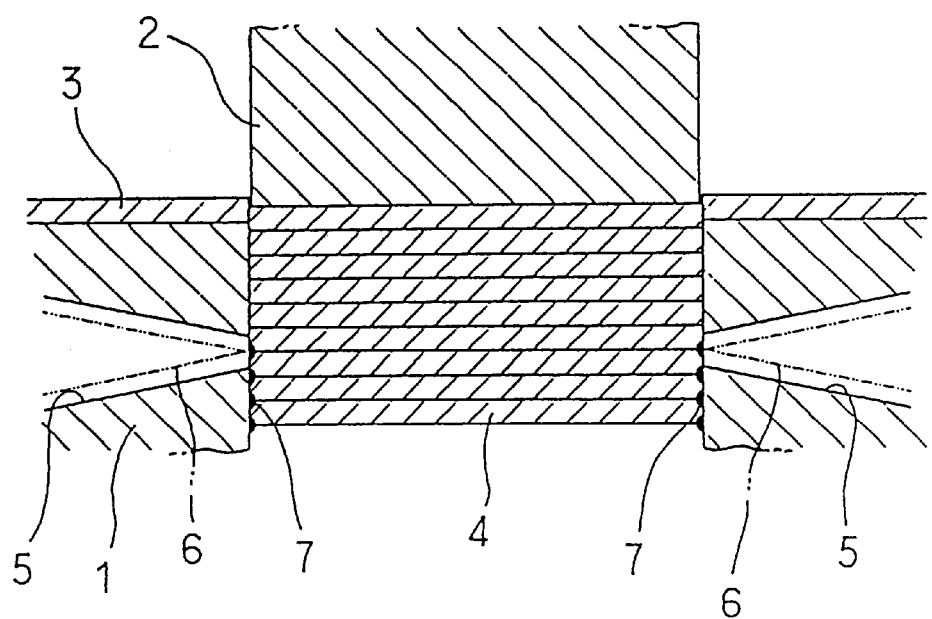
FIG. 2 is a partial longitudinal section of an core making apparatus.

Referring first to FIG. 2, an apparatus for making the core for the dynamoelectric machine is shown. The apparatus includes a die 1 serving as a lower die and a punch 2 serving as an upper die. The die 1 and punch 2 are used to blank a generally circular thin sheet core piece 4 from a hooped magnetic material 3 or steel sheet in coil fed on the die 1. The blanked core pieces 4 are forced into the die 1 to sequentially be stacked together. The die 1 is formed with a plurality of side through holes 5 through which laser beams 6 are irradiated from an irradiating head (not shown) onto boundaries between outer circumferential edges of the stacked core pieces 4 by means of continuous or spot irradiation. Consequently, the stacked core pieces 4 are successively welded together as at weld zones 7.

Figure 3:
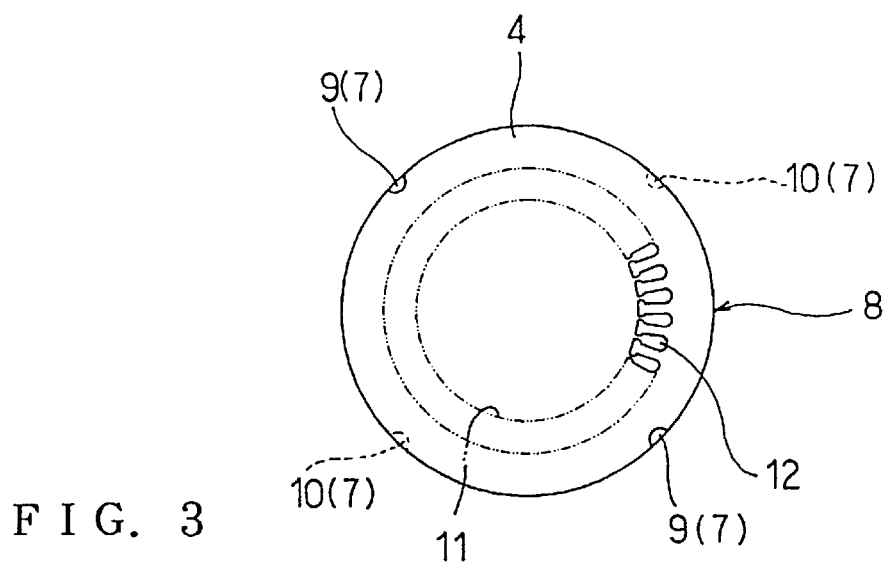
FIG. 3 is a plan view of a completed core.
Figure 4:
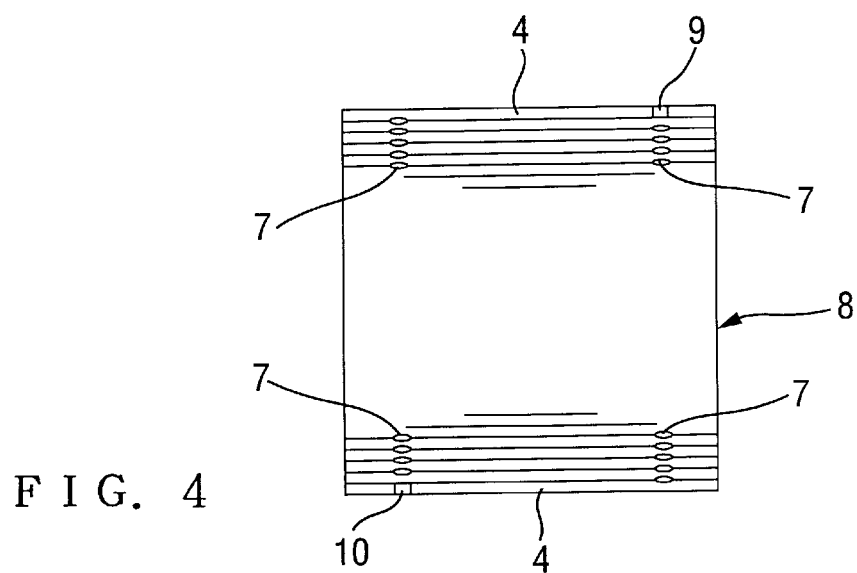
FIG. 4 is a front view of the completed core.
Figure 5:
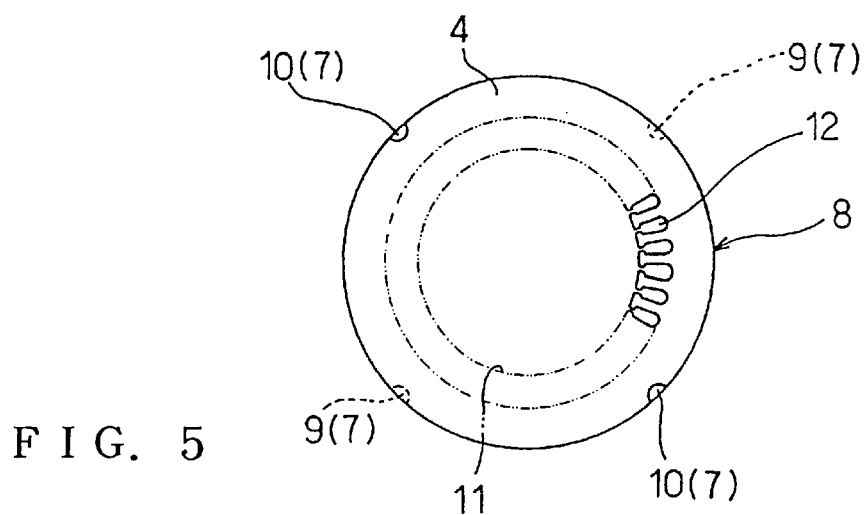
FIG. 5 is a bottom view of the completed core.

Each core piece 4 has a plurality of such weld zones 7. In the embodiment, each core piece 4 has four such weld zones 7 provided on the circumferential edge thereof to be spaced from one another by 90 degrees circumferentially thereof, as shown in FIGS. 3 to 5. The core piece 4 constituting one of two end faces of one core unit 8 or an uppermost layer of the core unit 8 has two generally semicircular notches 9. The notches 9 have positions corresponding to two of the four weld zones 7 or one half of the weld zones 7 of the core piece 4 respectively. The core piece 4 constituting the other end face of the core unit 8 or a lowermost layer of the core unit 8 also has two similar semicircular notches 10 having positions corresponding to two of the four weld zones 7 or one half of the weld zones 7 of the core piece 4 respectively. The notches 10 are shifted by 90 degrees from the notches 9.

Figure 6:
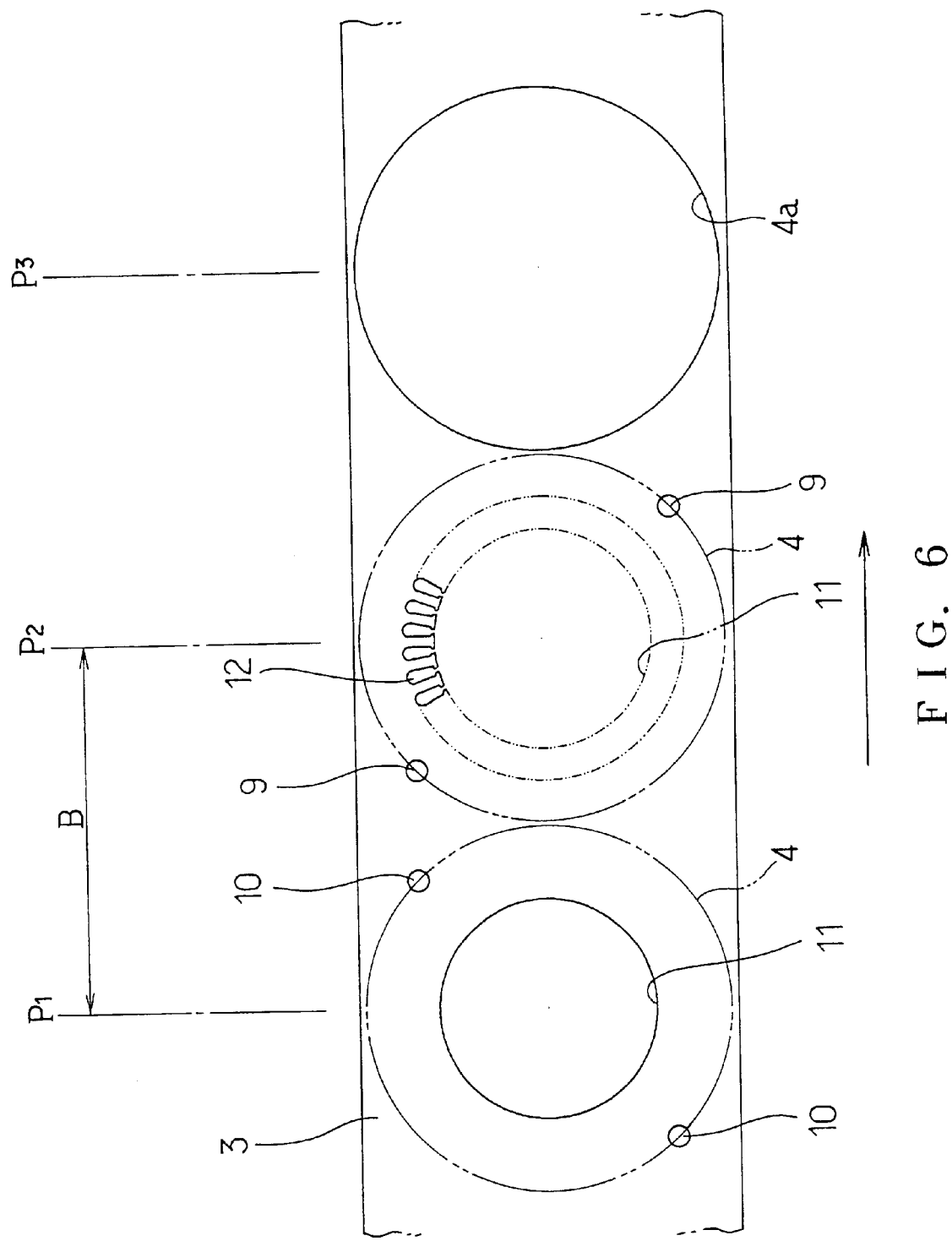
FIG. 6 is a plan view of a material for the core piece, showing a machining process therefor.

The blanking of the core pieces 4 by a plurality of dies 1 and punches 2 will now be described. The dies 1 and the punches 2 serve as progressive dies. First, a circular hole 11 forming a magnetic field at stage P1, and a number of holes serving as slots 12 are then formed around the hole 11 in the material 3 at stage P2. Furthermore, a circular core piece 4 is blanked out of the material 3 at stage P3. A hole 4a resulting from the blanking is shown in FIG. 6. These working stages P1, P2 and P3 are simultaneously carried out. The material 3 is fed in the direction of arrow by pitch B in FIG. 6, for example, so that the circular core pieces 4 having the holes 11 and the circumferential slots 12 are sequentially blanked out.

The notches 10 are selectively formed in the material 3 together with the hole 11 at stage P1, and the notches 9 are selectively formed in the material 3 together with the slots 12 at stage P2. These are circular holes at stages P1 and P2, and are located in the circumferential edge of the core piece 4, as shown by two-dot chain line in FIG. 6. These holes are formed into radial semicircular notches when the core piece 4 is blanked out of the material 3 at stage P3. Small punches (not shown) are selectively advanced to form the notches 9 and 10.

Figure 7:
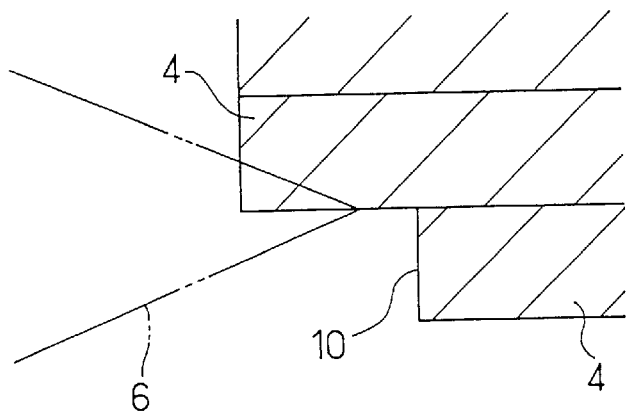
FIG. 7 is a partially enlarged longitudinal section of the stacked core pieces, showing laser beam irradiation onto the boundary between one core piece and another having notches.
Figure 8:
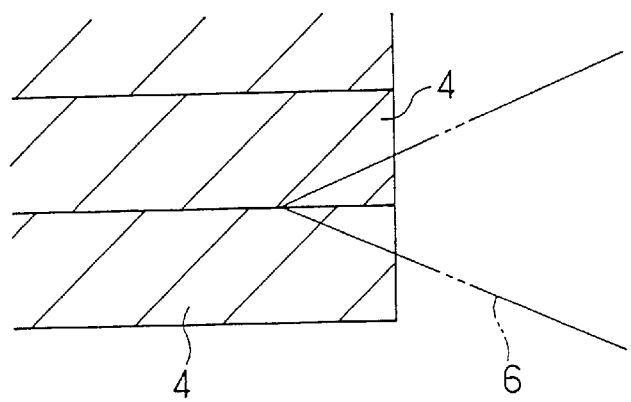
FIG. 8 is also a partially enlarged longitudinal section of the stacked core pieces, showing laser beam irradiation onto the boundary between two core pieces each having no notches.

In the stacking and welding of the core pieces 4, the core piece 4 having the notches 10 is first blanked out of the material 3. The core pieces 4 having neither notches 9 or 10 are then blanked and stacked on the previously blanked core piece 4 having the notches 10. Subsequently, the core pieces 4 without the notches 9 or 10 are repeatedly blanked and stacked. On the other hand, laser beams 6 emitted from the irradiating head are spot-irradiated onto the core pieces 4 forced into the die 1 so that the stacked core pieces 4 are welded to be combined together. Even when the laser beam 6 is irradiated onto the boundary between the core piece 4 with the notches 10 and the upper layer core piece 4 stacked on the former as shown in FIG. 7, the former core piece 4 lacks portions serving for the welding due to the provision of the notches 10. Accordingly, the upper layer core piece 4 is melted at the most and is not combined with the lower core piece 4. However, these core pieces 4 are melted to be combined together at the weld zones 7 other than the notches 10 when the laser beams 6 are irradiated thereonto, as shown in FIG. 8.

Furthermore, when the laser beams 6 are irradiated onto the stacked core pieces 4 having neither notches 9 nor 10, they are melted to be combined together at all the weld zones 7 where the laser beams 6 are irradiated.

Figure 9:
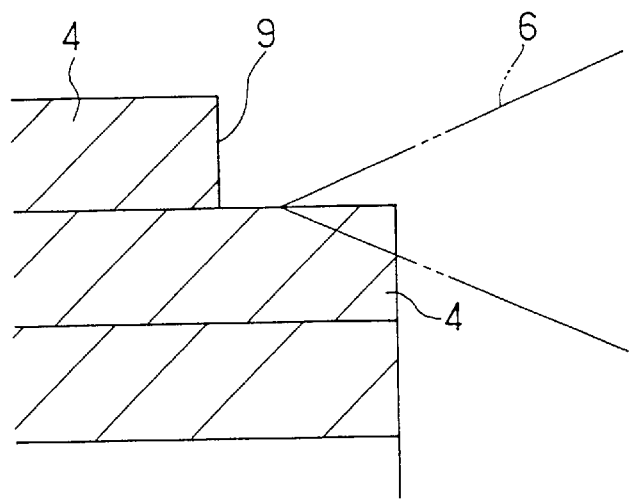
FIG. 9 is also a partially enlarged longitudinal section of the stacked core pieces, showing laser beam irradiation onto the boundary between one core piece and another having notches.
Figure 10:
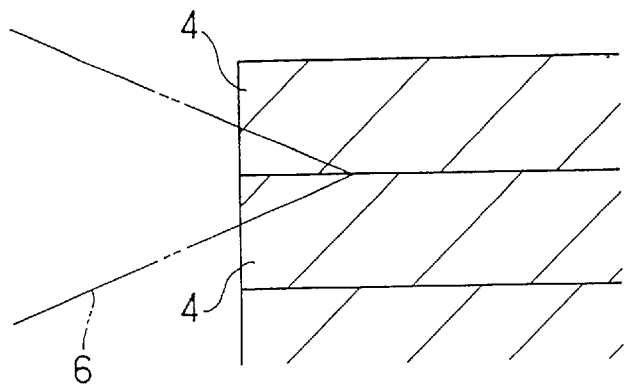
FIG. 10 is also a partially enlarged longitudinal section of the stacked core pieces, showing laser beam irradiation onto the boundary between two core pieces each having no notches.

Subsequently, the core piece 4 having the notches 9 is blanked out to be stacked on the previous one when all the core pieces 4 but the last one are stacked. Even when the laser beam 6 is irradiated onto the boundary between the core piece 4 with the notches 9 and the lower layer core piece 4 stacked on the former as shown in FIG. 9, the former core piece 4 lacks portions serving for the welding due to the provision of the notches 9. Accordingly, the lower layer core piece 4 is melted at the most but is not combined with the upper core piece 4. However, these core pieces 4 are melted to be combined together at the weld zones other than the notches 9 when the laser beams 6 are irradiated thereonto, as shown in FIG. 10.

Figure 11:
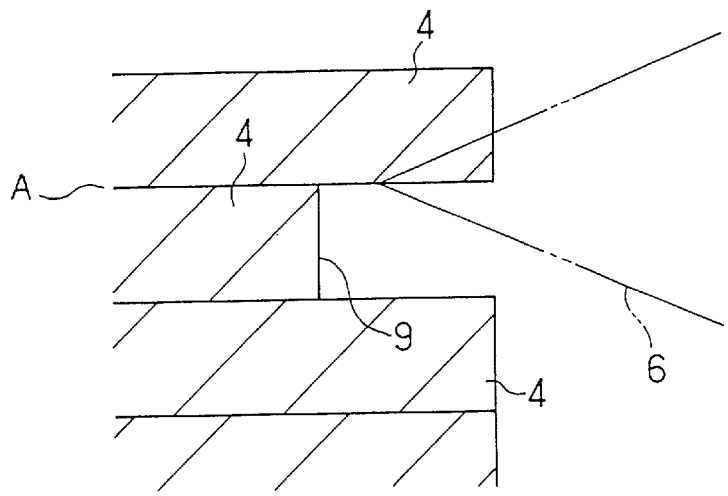
FIG. 11 is also a partially enlarged longitudinal section of the stacked core pieces, showing laser beam irradiation onto the boundary between one core piece and another having notches.
Figure 12:
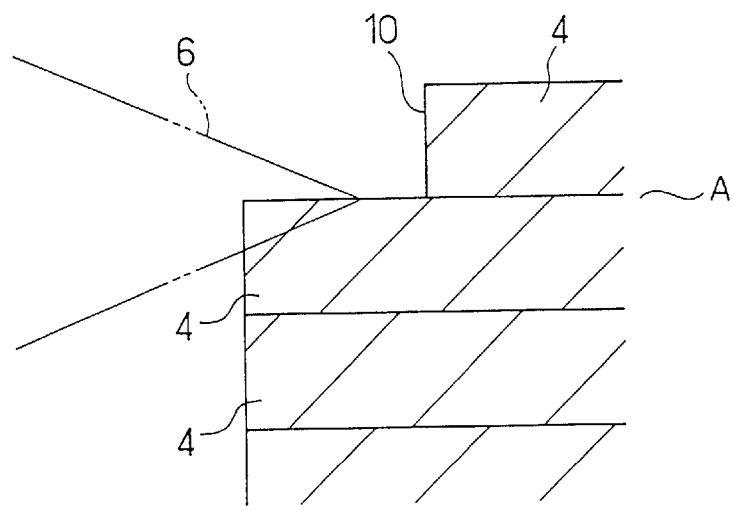
FIG. 12 is also a partially enlarged longitudinal section of the stacked core pieces, showing laser beam irradiation onto the boundary between one core piece and another having notches.
Figure 13:
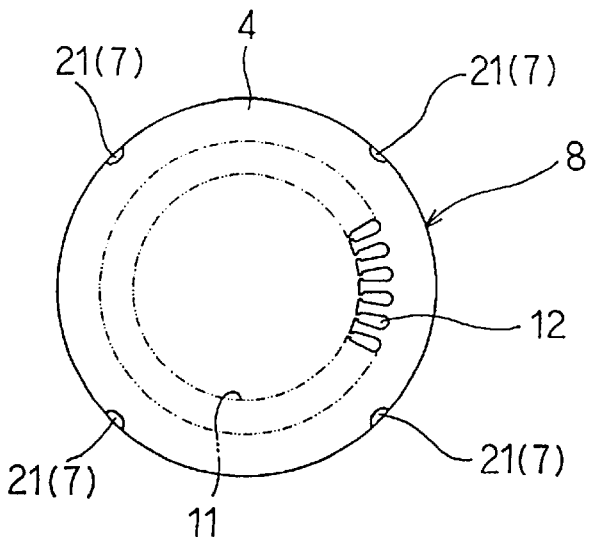
FIG. 13 is a view similar to FIG. 3, showing a second embodiment in accordance with the present invention.
Figure 14:
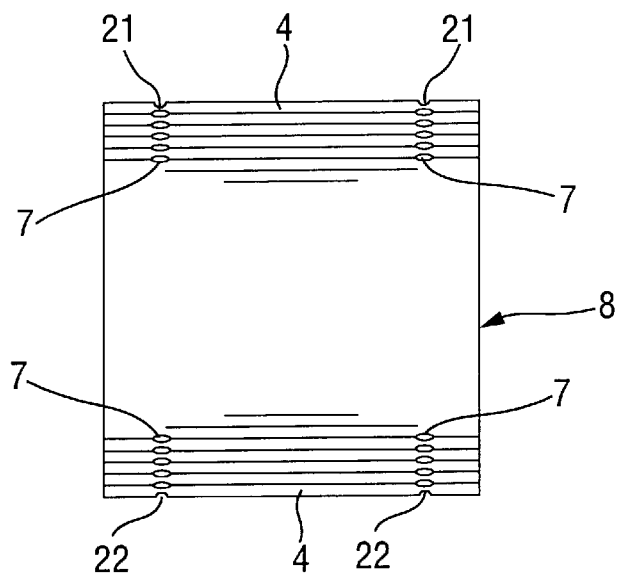
FIG. 14 is a view similar to FIG. 4, showing the second embodiment.
Figure 15:
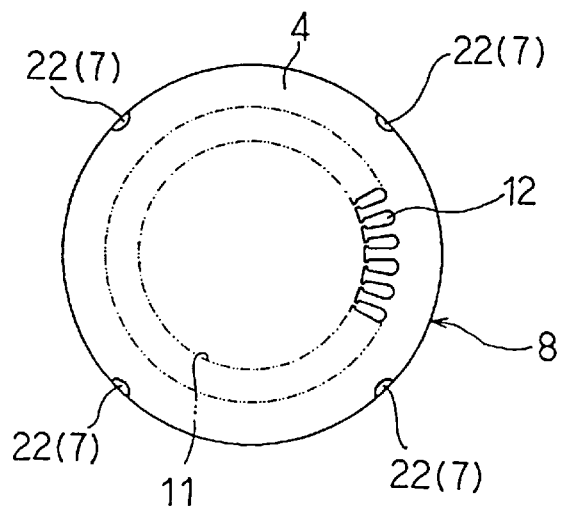
FIG. 15 is a view similar to FIG. 5, showing the second embodiment.

Subsequently, the core piece 4 having the notches 10 is blanked to be stacked on the core piece 4 having the notches 9. When the laser beams 6 are irradiated onto the boundary between the core pieces 4 having the respective notches 9 and 10, as shown in FIG. 11, the core piece 4 having the notches 9 lacks portions serving for the welding due to the provision of the notches 9. Accordingly, the upper layer core piece 4 is melted at the most but is not combined with the lower core piece 4. Furthermore, the core piece 4 having the notches 10 lacks portions serving for the welding due to the provision of the notches 10, as shown in FIG. 12. Accordingly, the lower layer core piece 4 is melted at the most but is not combined with the upper layer core piece 4. That is, these core pieces 4 having the respective notches 9 and 10 are not welded together even when the laser beams 6 are irradiated onto the boundary therebetween. Consequently, each one core unit 8 is separable from the subsequent core unit 8. The above-described working steps are repeated for the subsequent core units 8 when the core piece 4 having the notches 10 has been blanked out.

According to the above-described embodiment, the uppermost layer core piece 4 of each core unit 8 lacks the portions serving for the welding due to the notches 9 formed in one half of the weld zones thereof. The lowermost layer core piece 4 of each core unit 8 also lacks the portions serving for the welding due to the notches 10 formed in one half of the weld zones thereof corresponding to the other half of the weld zones of the uppermost layer core piece 4. Accordingly, the uppermost layer core piece 4 of each one core unit 8 and the lowermost layer core piece 4 of the subsequent core unit 8 are not combined together even when the laser beam 6 is irradiated onto the boundary A therebetween shown in FIG. 1. Consequently, each one core unit 8 can reliably be separated from the subsequent one at the boundary A without interruption of irradiation of laser beams 6 thereat. Thus, the core units 8 can be separated even when the thickness of the core pieces 4 is varied. Furthermore, since no thickness measuring device is required, an increase in the cost of equipment can be avoided.

FIGS. 13 to 19 illustrate a second embodiment of the present invention. The differences between the first and second embodiments will be described. Four concavities 21 are formed in the surface of the core piece 4 constituting one of the end faces of each core unit 8 or the uppermost layer of the latter so as to correspond to all the weld zones of the core piece 4, respectively. Four similar concavities 22 are also formed in the underside of the core piece 4 constituting the other end face of the core unit 8 so as to correspond to all the weld zones of the core piece 4, respectively. Each of the concavities 21 and 22 is concave in the direction of thickness of the core piece 4 and has a depth which is one half of or above a thickness of the core piece 4.

Figure 16:
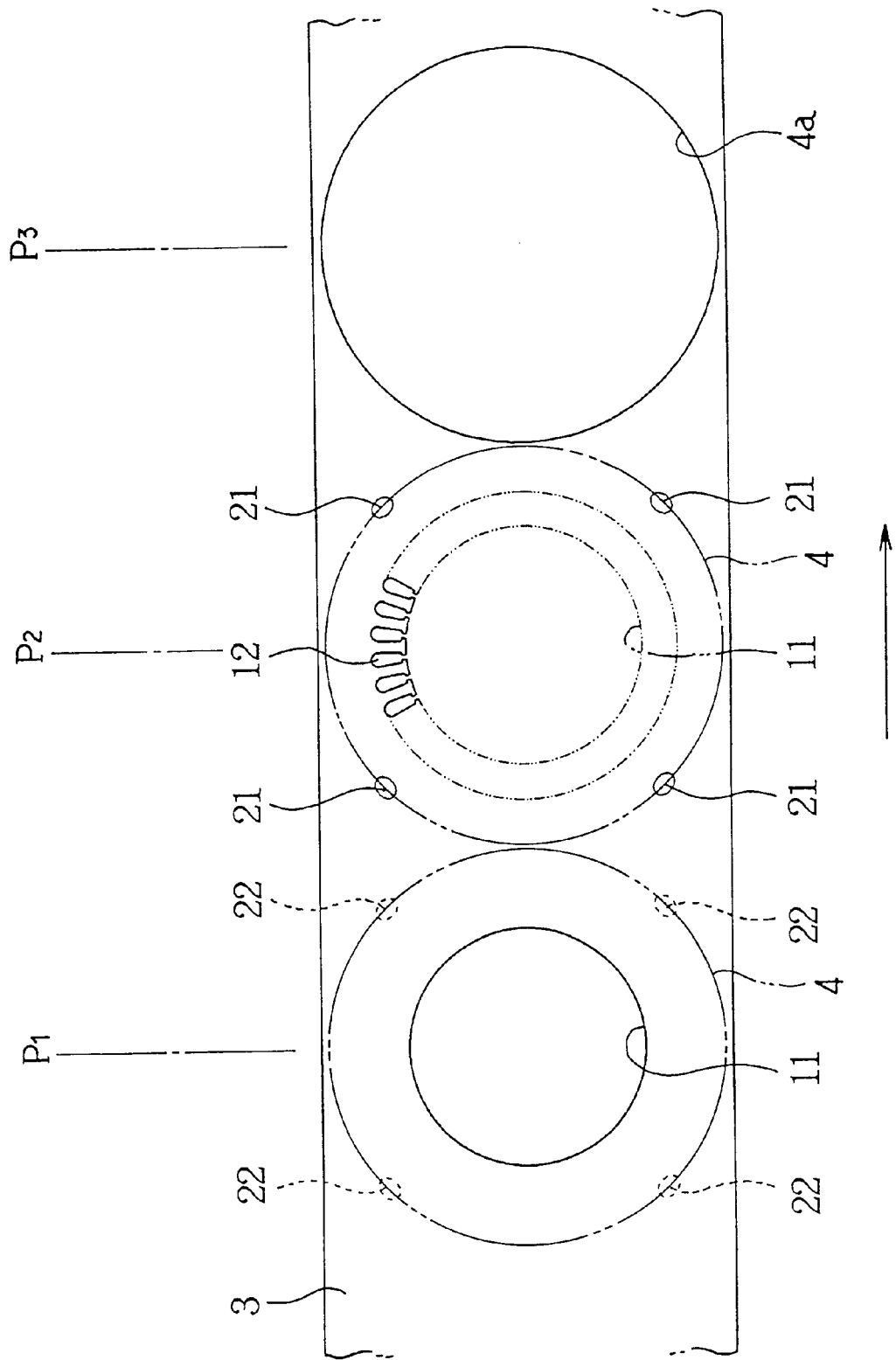
FIG. 16 is a view similar to FIG. 6, showing the second embodiment.

The concavities 21 are selectively formed in the material 3 from the surface or upper side at stage P1 of the progressive dies, whereas the concavities 22 are selectively formed in the material 3 from the underside or lower side at stage P2, as shown in FIG. 16. These concavities 21 and 22 are elliptical at stages P1 and P2 and are located on the circumferential edge of the core piece 4, as shown by two dot chain line in FIG. 16. These holes are rendered semi-elliptical when the core piece 4 is blanked out of the material 3 at stage P3.

Figure 17:
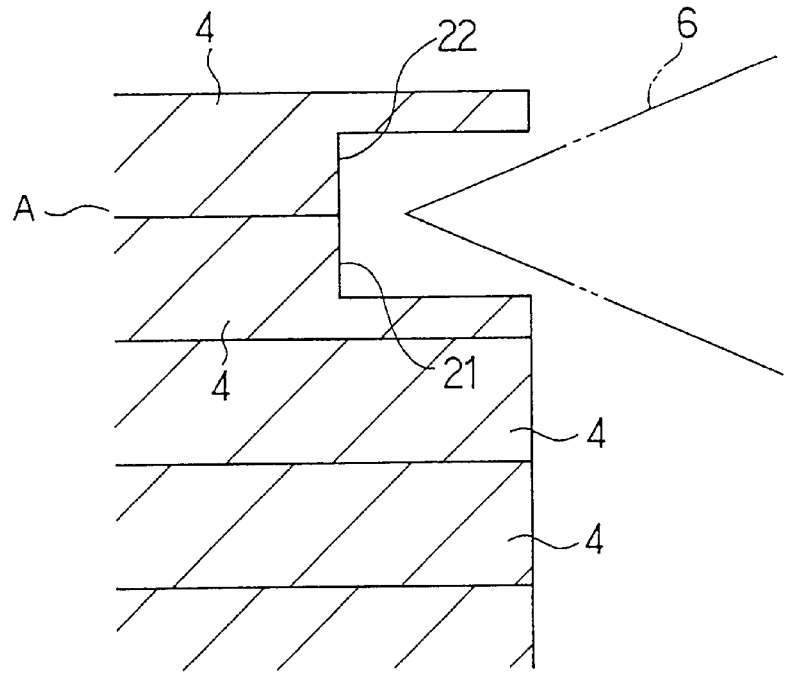
FIG. 17 is a view similar to FIG. 11, showing the second embodiment.
Figure 18:
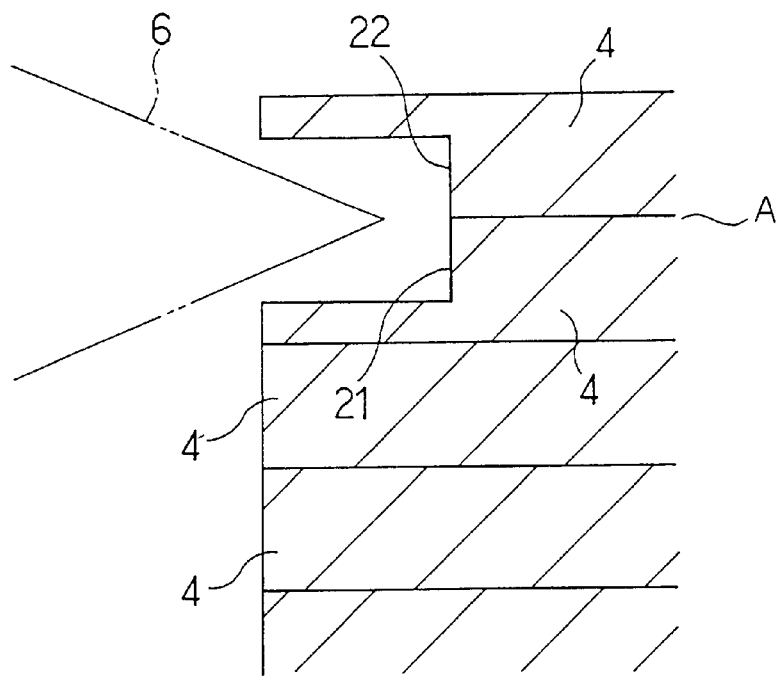
FIG. 18 is a view similar to FIG. 12, showing the second embodiment.
Figure 19:
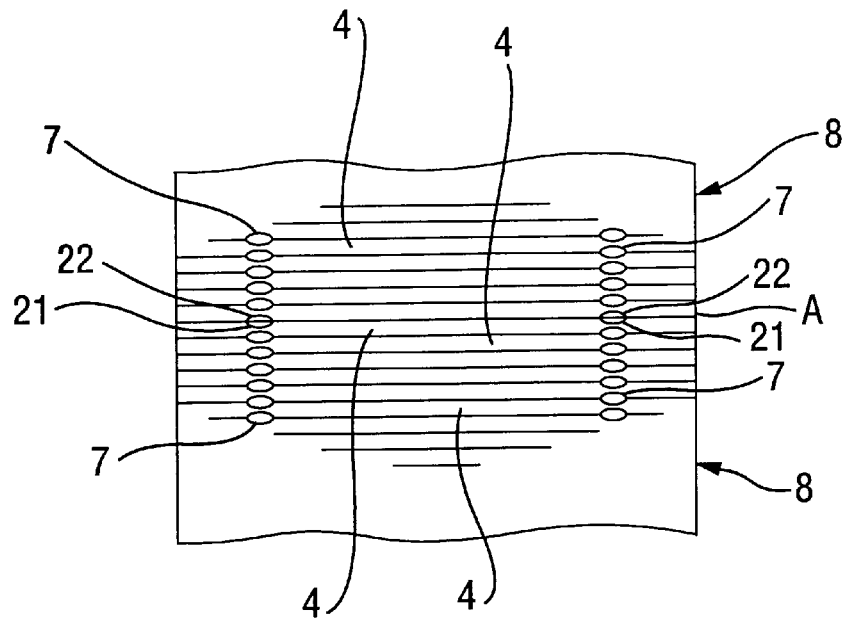
FIG. 19 is a view similar to FIG. 1, showing the second embodiment.
Figure 20:
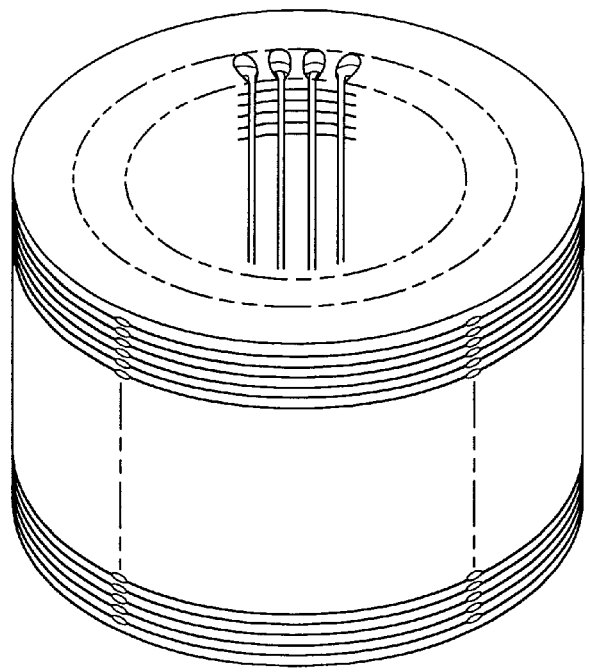
FIG. 20 is a perspective view of a completed laminated core in accordance with the prior art.

According to the second embodiment, the uppermost layer core piece 4 of each core unit 8 lacks the portions serving for the welding due to the concavities 21 formed in the surface thereof. The lowermost layer core piece 4 of each core unit 8 also lacks the portions serving for the welding due to the concavities 22 formed in the underside thereof. Accordingly, the uppermost layer core piece 4 of each one core unit 8 and the lowermost layer core piece 4 of the subsequent core unit 8 are not combined together even when the laser beams 6 are irradiated onto the boundary A therebetween, as shown in FIGS. 17 and 18. Thus, neither uppermost nor lowermost layer core pieces 4 are melted into combination. Consequently, since each one core unit 8 can reliably be separated from the subsequent one at the boundary A without interruption of irradiation of laser beams 6 thereat, too, the same effect can be achieved in the second embodiment as in the first embodiment.

Although the present invention has been applied to the core for dynamoelectric machines and the method of making the core in the foregoing embodiments, the invention may be applied to cores for magnetic pickup or recording heads used in tape recorders or transformers and methods of making them. Furthermore, a continuous laser beam irradiation may be executed in the foregoing embodiments, instead of the spot irradiation. Particularly, the continuous laser beam irradiation is advantageous in that the welding can more reliably be executed even when the thickness of the core piece 4 is varied.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

We claim:

1. A laminated core wherein thin sheet core pieces each blanked into a predetermined configuration are stacked one upon another and are successively welded at a plurality of weld zones provided on an edge of each core piece by continuous or spot irradiation of laser beams so that the core pieces are combined together so as to have two end faces, the core comprising:

first notches formed in one half of the weld zones of the core piece constituting one of the end faces of the core; and second notches formed in one half of the weld zones of the core piece constituting the other end face of the core, said one half of the weld zones of the core piece constituting said other end face of the core corresponding to the other half of the weld zones of the core piece constituting said one end face of the core.

2. A laminated core wherein thin sheet core pieces each blanked into a predetermined configuration are stacked one upon another and are successively welded at a plurality of weld zones provided on an edge of each core piece by continuous or spot irradiation of laser beams so that the core pieces are combined together so as to have two end faces, the core comprising:

first concavities formed in portions of a surface of the core piece constituting one of the end faces of the core, the portions of the surface corresponding to the weld zones, each first concavity having a depth equal to or above one half of a thickness of the core piece; and second concavities formed in portions of an underside of the core piece constituting the other end face of the core, the portions of the underside corresponding to the weld zones, each second concavity having a depth equal to or above one half of the thickness of the core piece.

3. A laminated core comprising thin sheet core pieces each blanked out into a predetermined configuration and stacked one upon another, the core pieces being successively welded at a plurality of weld zones provided on an edge of each core piece by continuous or spot irradiation of laser beams so that the core pieces are combined together so as to have two end faces, wherein the core piece constituting one of the end faces of the core has first notches formed to correspond one half of the weld zones thereof, and wherein the core piece constituting the other end face of the core has second notches formed to correspond to one half of the weld zones thereof, said one half of the weld zones of the core piece constituting said other end face of the core corresponding to the other half of the weld zones of the core piece constituting said one end face of the core.

4. A laminated core comprising thin sheet core pieces each blanked out into a predetermined configuration and stacked one upon another, the core pieces being successively welded at a plurality of weld zones provided on an edge of each core piece by continuous or spot irradiation of laser beams so that the core pieces are combined together so as to have two end faces, wherein the core piece constituting one of the end faces of the core has first concavities formed in portions of a surface thereof corresponding to the weld zones, and wherein the core piece constituting the other end face of the core has second concavities formed in portions of an underside thereof corresponding to the weld zones, each of the first and second concavities having a depth equal to or above one half of the thickness of the core piece.

* * * * *